(12) United States Patent
Zhao et al.

(10) Patent No.: US 11,553,208 B2
(45) Date of Patent: Jan. 10, 2023

(54) METHOD AND SYSTEM OF VIDEO CODING USING A SUBSET OF AVAILABLE INTRA PREDICTION MODES FOR MULTIPLE REFERENCE LINES

(71) Applicant: Tencent America LLC, Palo Alto, CA (US)

(72) Inventors: Liang Zhao, Sunnyvale, CA (US); Xin Zhao, San Diego, CA (US); Shan Liu, San Jose, CA (US)

(73) Assignee: TENCENT AMERICA LLC, Palo Alto, CA (US)

( * ) Notice: Subject to any disclaimer, the term of this patent is extended or adjusted under 35 U.S.C. 154(b) by 0 days.

(21) Appl. No.: 17/079,417

(22) Filed: Oct. 23, 2020

(65) Prior Publication Data

US 2021/0160539 A1 May 27, 2021

Related U.S. Application Data

(60) Provisional application No. 62/941,342, filed on Nov. 27, 2019.

(51) Int. Cl.
*H04N 19/593* (2014.01)
*H04N 19/176* (2014.01)
(Continued)

(52) U.S. Cl.
CPC ......... *H04N 19/593* (2014.11); *H04N 19/176* (2014.11); *H04N 19/184* (2014.11); *H04N 19/44* (2014.11)

(58) Field of Classification Search
None
See application file for complete search history.

(56) References Cited

U.S. PATENT DOCUMENTS 9,197,895 B2   11/2015  Oh et al.
2018/0146211 A1  5/2018  Zhang et al.
(Continued)

FOREIGN PATENT DOCUMENTS

WO   2018070267 A1   4/2018
WO   2019047883 A1   3/2019
(Continued)

OTHER PUBLICATIONS

P. Rivaz et al., "AV1 Bitstream & Decoding Process Specification", The Alliance for Open Media, 2018, [online] Available: https://aomediacodec.github.io/av1-spec/av1-spec.pdf. 681 pages.
(Continued)

*Primary Examiner* — Alison Slater
(74) *Attorney, Agent, or Firm* — Anova Law Group PLLC

(57) ABSTRACT

A video decoding method includes obtaining a bitstream including a plurality of coded frames of a video signal; decoding each of the plurality of coded frames into a plurality of CTUs and each of the plurality of CTUs into a plurality of residual blocks; recovering a coding block for each of the plurality of residual blocks based on multiple reference line intra prediction flags and reference samples included in each coded frame, wherein a subset of all available intra prediction modes, is determined for each of the multiple reference lines selected for intra prediction based on coding efficiency and compression performance, and each of the multiple reference lines is identified by an index number; reconstructing each frame of the video signal by storing the recovered coding block for each of the plurality of residual blocks in a frame buffer; and continuously outputting the reconstructed frames to restore the video signal.

17 Claims, 10 Drawing Sheets

(51) Int. Cl.
*H04N 19/184* (2014.01)
*H04N 19/44* (2014.01)

(56) References Cited

U.S. PATENT DOCUMENTS

| | | | |
|---|---|---|---|
| 2018/0176582 A1 | 6/2018 | Zhao et al. | |
| 2019/0116381 A1 | 4/2019 | Lee et al. | |
| 2019/0124342 A1* | 4/2019 | Young | H04N 19/18 |
| 2019/0238839 A1 | 8/2019 | Ikeda | |
| 2019/0335199 A1* | 10/2019 | Joshi | H04N 19/12 |
| 2020/0021817 A1* | 1/2020 | Van der Auwera | H04N 19/159 |
| 2021/0029352 A1* | 1/2021 | Zhang | H04N 19/96 |
| 2021/0120240 A1* | 4/2021 | Bross | H04N 19/132 |
| 2021/0266557 A1* | 8/2021 | Choi | H04N 19/159 |
| 2022/0038684 A1* | 2/2022 | Urban | H04N 19/70 |

FOREIGN PATENT DOCUMENTS

| | | |
|---|---|---|
| WO | 2019155451 A1 | 8/2019 |
| WO | 2019194950 A1 | 10/2019 |

OTHER PUBLICATIONS

Yue Chen et al., "An Overview of Core Coding Tools in the AV1 Video Codec," 2018 Picture Coding Symposium (PCS), pp. 41-45, Jun. 2018. 5 pages.
Liang Zhao et al,. "CE3-related: Intra mode coding," Joint Video Experts Team (JVET) of ITU-T SG 16 WP 3 and ISO/IEC JTC 1/SC 29/WG 11, Oct. 2018, JVET-L0280-r1. 3 pages.
Benjamin Bross et al., "CE3: Multiple reference line intra prediction (Test 1.1.1, 1.1.2, 1.1.3 and 1.1.4)," Joint Video Experts Team (JVET) of ITU-T SG 16 WP 3 and ISO/IEC JTC 1/SC 29/WG 11, Oct. 2018, JVET-L0283. 6 pages.
Benjamin Bross et al., "CE3: Multiple reference line intra prediction (Test 1.1.1, 1.1.2, 1.1.3 and 1.1.4)," Joint Video Experts Team (JVET) of ITU-T SG 16 WP 3 and ISO/IEC JTC 1/SC 29/WG 11, Oct. 2018, JVET-L0283-v2. 7 pages.
Benjamin Bross et al., "Versatile Video Coding (Draft 2)," Joint Video Experts Team (JVET) of ITU-T SG 16 WP 3 and ISO/IEC JTC 1/SC 29/WG 11, Jul. 2018, JVET-K1001-v6. 141 pages.
The World Intellectual Property Organization (WIPO) International Search Report for PCT/US2020/062446 dated Dec. 2, 2021 2 Pages.
Japan Patent Office (JPO), The Office Action For JP Application No. 2021-558676, dated Oct. 25, 2022, 11 Pages (Translation Included).
Liang Zhao et al., "Further investigations on multi-line intra prediction", Apr. 2018, pp. 1-3. Joint Video Exploration Team (JVET) of ITU-T SG 16 WP 3 and ISO/IEC JTC 1/SC 29/WG 11, JVET-J0065 -v2, 10th Meeting: San Diego, US.
Yue Chen, et al.,"An Overview of Core Coding Tools in the AV1 Video Codec", 2018 ,pp. 41-45, PCS 2018, IEEE.
Benjamin Brass et al., "Wiegand, CE3: Multiple reference line intra prediction (Test 5.4.1, 5.4.2, 5.4.3 and 5.4.4)", Jul. 2018, pp. 1-8 . Joint Video Experts Team (JVET) of ITU-T SG 16 WP 3 and ISO/IEC JTC 1/SC 29/WG 11, JVET-K0051-v1, 11th Meeting: Ljubljana, SI.

\* cited by examiner $$
\begin{aligned}
S2 \quad &= L1 + L2 \\
&= 2^L + 2^M \\
S1 \quad &= L1 \\
&= 2^L \text{ (angular intra prediction modes)}
\end{aligned}
$$

FIG. 12A $$
\begin{aligned}
S2 \quad &= L1 + L2 + L3 \\
&= 2^L + 2^M + 2^N \\
S1 \quad &= L1 + L2 \\
&= 2^L + 2^M \text{ (angular intra prediction modes)}
\end{aligned}
$$

FIG. 12B

METHOD AND SYSTEM OF VIDEO CODING USING A SUBSET OF AVAILABLE INTRA PREDICTION MODES FOR MULTIPLE REFERENCE LINES

RELATED APPLICATIONS

This application claims priority to U.S. provisional patent application No. 62/941,342, filed on Nov. 27, 2019, content of which is incorporated by reference in its entirety.

FIELD OF THE TECHNOLOGY

This application relates to the field of video coding technologies and, specifically, to a method and system of video coding with multiple reference line intra prediction.

BACKGROUND OF THE DISCLOSURE

AOMedia Video 1 (AV1) is an open video coding format designed for video transmissions over the Internet. It was developed as a successor to VP9 by the Alliance for Open Media (AOMedia), a consortium founded in 2015 that includes semiconductor firms, video on demand providers, video content producers, software development companies and web browser vendors. Building on the codebase of VP9, AV1 incorporates additional techniques, several of which were developed in these experimental formats. The first version 0.1.0 of the AV1 reference codec was published on 7 Apr. 2016. The Alliance announced the release of the AV1 bitstream specification on 28 Mar. 2018, along with a reference, software-based encoder and decoder. On 25 Jun. 2018, a validated version 1.0.0 of the specification was released. On 8 Jan. 2019 a validated version 1.0.0 with Errata 1 of the specification was released. The AV1 bitstream specification includes a reference video codec.

ITU-T VCEG (Q6/16) and ISO/IEC MPEG (JTC 1/SC 29/WG 11) published the H.265/HEVC (High Efficiency Video Coding) standard in 2013 (version 1) 2014 (version 2) 2015 (version 3) and 2016 (version 4). In 2015, these two standard organizations jointly formed the JVET (Joint Video Exploration Team) to explore the potential of developing the next video coding standard beyond HEVC In October 2017, they issued the Joint Call for Proposals on video Compression with Capability beyond HEVC (CfP). By Feb. 15, 2018, total 22 CfP responses on standard dynamic range (SDR), 12 CfP responses on high dynamic range (HDR), and 12 CfP responses on 360 video categories were submitted, respectively. In April 2018, all received CfP responses were evaluated in the 122 MPEG/10th JVET meeting. As a result of this meeting, JVET formally launched the standardization process of next-generation video coding beyond HEVC. The new standard was named Versatile Video Coding (VVC), and JVET, Joint Video Exploration Team, was renamed as JVET Joint Video Experts Team.

In the video coding scheme based on the AV1 standard, the number of available intra prediction modes is 62, which includes 56 angular (or directional) intra prediction modes, 5 smooth modes, and one chroma from luma mode. In the description of the present disclosure, the angular (or directional) intra prediction modes are also called angular (or directional) modes. When multiple reference lines are applied in intra prediction and all the intra prediction modes are included for the multiple reference lines, the video coding complexity is substantial. The multiple reference lines include a zero reference line with an index number equal to zero and one or more non-zero reference lines with the index numbers greater than zero. It is desired to limit the number of the intra prediction modes allowed for each of the non-zero reference lines. In the video coding scheme based on the VVC standard, the intra prediction modes are determined to include most probable modes (MPM) in the allowed intra prediction mode (AIPM) set. However, the AV1 does not define similar most probable modes (MPM), and the multiple reference line intra prediction of the video coding scheme based on the VVC standard cannot be directly applied to the video coding scheme based on the AV1 standard.

The disclosed methods and systems are directed to solve one or more problems set forth above and other problems.

SUMMARY

One aspect of the present disclosure includes a video decoding method. The method includes: obtaining a bitstream including a plurality of coded frames of a video signal; decoding each of the plurality of coded frames into a plurality of coding tree units (CTUs) and each of the plurality of CTUs into a plurality of residual blocks; recovering a coding block for each of the plurality of residual blocks based on multiple reference line intra prediction (MRLP) flags and reference samples included in each coded frame, where a subset of all available intra prediction modes, also known as an allowed intra prediction mode set (AIPM), is determined for each of the multiple reference lines selected for intra prediction based on coding efficiency and compression performance, and each of the multiple reference lines is identified by an index number, which is an integer greater than or equal to zero; reconstructing each frame of the video signal by storing the recovered coding block for each of the plurality of residual blocks in a frame buffer; and continuously outputting the reconstructed frames to restore the video signal.

Another aspect of the present disclosure includes a video encoding method. The method includes obtaining a current frame of a video input; partitioning the obtained current frame into a plurality of blocks; predicting a symbol level for each partitioned block by incorporating multiple reference line intra prediction, where intra prediction modes are derived based on multiple reference lines of neighboring blocks, a subset of all available intra prediction modes, also known as an allowed intra prediction mode set (AIPM), is determined for each of the multiple reference lines based on coding efficiency and compression performance, and each of the multiple reference lines is identified by an index number, which is an integer greater than or equal to zero; transforming and quantizing a residual symbol level derived by subtracting the predicted symbol level from a current symbol level; entropy coding the transformed and quantized residual symbol level; and generating a bitstream including the entropy coded residual symbol level.

Other aspects of the present disclosure can be understood by those skilled in the art in light of the description, the claims, and the drawings of the present disclosure.

BRIEF DESCRIPTION OF THE DRAWINGS

FIG. 12A and FIG. 12B illustrate exemplary determinations of intra prediction modes included in S1 and S2 consistent with embodiments of the present disclosure.

DESCRIPTION OF EMBODIMENTS

The following describes the technical solutions in the embodiments of the present invention with reference to the accompanying drawings. Wherever possible, the same reference numbers will be used throughout the drawings to refer to the same or like parts. Apparently, the described embodiments are merely some but not all the embodiments of the present invention. Other embodiments obtained by a person skilled in the art based on the embodiments of the present invention without creative efforts shall fall within the protection scope of the present disclosure. Certain terms used in this disclosure are first explained in the followings.

Versatile Video Coding (VVC): VVC is a video decoding standard developed by the Joint Video Exploration Team (WET) to succeed the HEVC (also known as ITU-T H.265). VVC specifies a video coding technology with a compression capability that is substantially beyond that of the prior generations of such standards and is highly versatile for effective use in a broadened range of applications. VVC standard is incorporated herein by reference.

AOMedia Video 1 (AV1): AV1 is an open-source video coding standard developed by the Alliance for Open Media (AOMedia) for video transmissions over the Internet. AV1 standard is incorporated herein by reference.

Allowed intra prediction modes (AIPM): defined as one mode set with modes that can be used for intra prediction of current block derived according to the intra prediction modes of neighboring blocks.

Disallowed intra prediction modes (DIPM): defined as one mode set with modes that cannot be signaled or used for intra prediction of current block and derived according to the intra prediction modes of neighboring blocks.

Context-based Adaptive Binary Arithmetic Coding (CABAC): CABAC is a form of entropy coding used in various video coding standards.

Versatile video coding Test Model (VTM): VTM provides an encoder side description of VVC algorithm and the test procedures.

Bjontegaard delta rate (BDR or BD-rate): BDR is a method of evaluating coding efficiency by measuring bitrate changes for a same peak signal-to-noise ratio (PSNR) of video signals.

Figure 1:
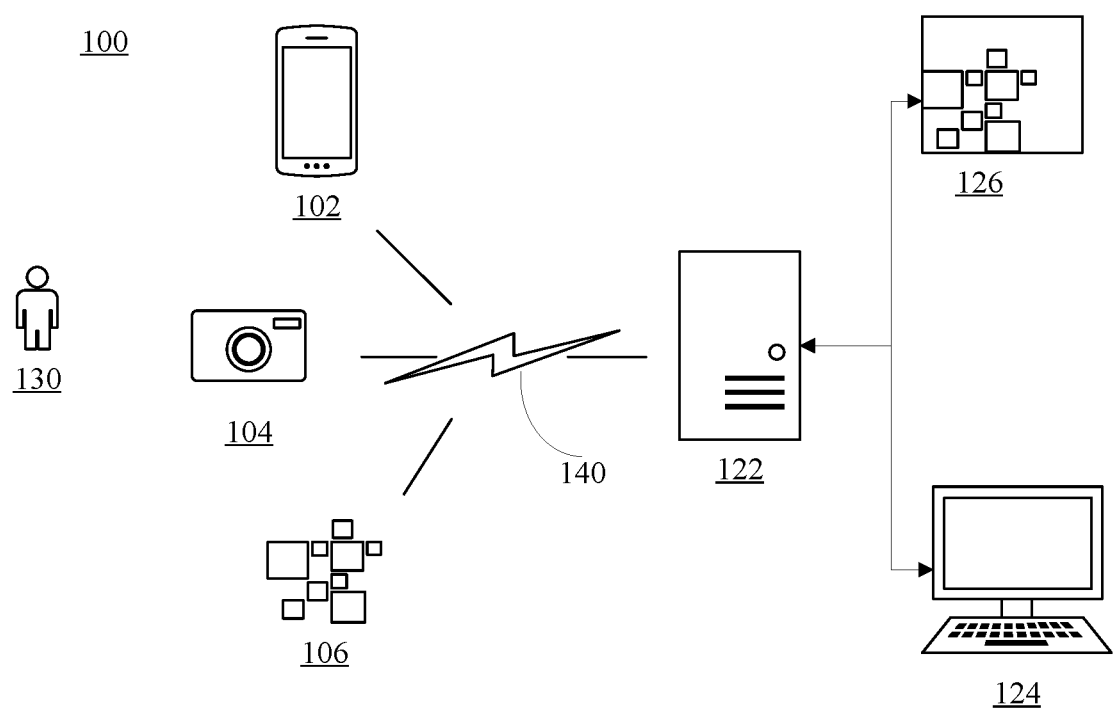
FIG. 1 illustrates an operating environment incorporating certain embodiments of the present disclosure.

FIG. 1 shows an operating environment 100 incorporating certain embodiments of the present disclosure. As shown in FIG. 1, the operating environment 100 may include a variety of devices with video functionalities. For example, the operating environment 100 may include a terminal device 102, a camera device 104, and an internet of things (IoT) device 106. Other types of devices may also be included.

The operating environment 100 may also include a server 122, a human vision application 124, a machine vision application 126, and a communication link 140 connecting the variety of devices to the server 122. A user 130 may use, access, or control one or more of the variety of devices.

The terminal device 102 may include any user terminal, such as a personal digital assistant (PDA), a mobile phone, a smart phone, an integrated messaging device (IMD), a tablet computer, a notebook computer, a desktop computer, and other computing devices. The camera device 104 may include any image or video capturing devices, such as a digital camera, a video camera, a security camera, a vehicle on-board camera, and a stereo camera, etc. The IoT device 106 may include any type of IoT device with a camera function, such as a digital doorbell, an autonomous driving sensor, a digital voice assistant, a smart speaker, a smart appliance, and any industrial or commercial IoT systems. Any of the variety of devices 102, 104, and 106 may be stationary or mobile when carried by an individual who is moving, and may also be located as a part or in a mode of transport including a car, a truck, a taxi, a bus, a train, a boat, an airplane, a bicycle, a motorcycle or any similar suitable mode of transport.

Figure 2:
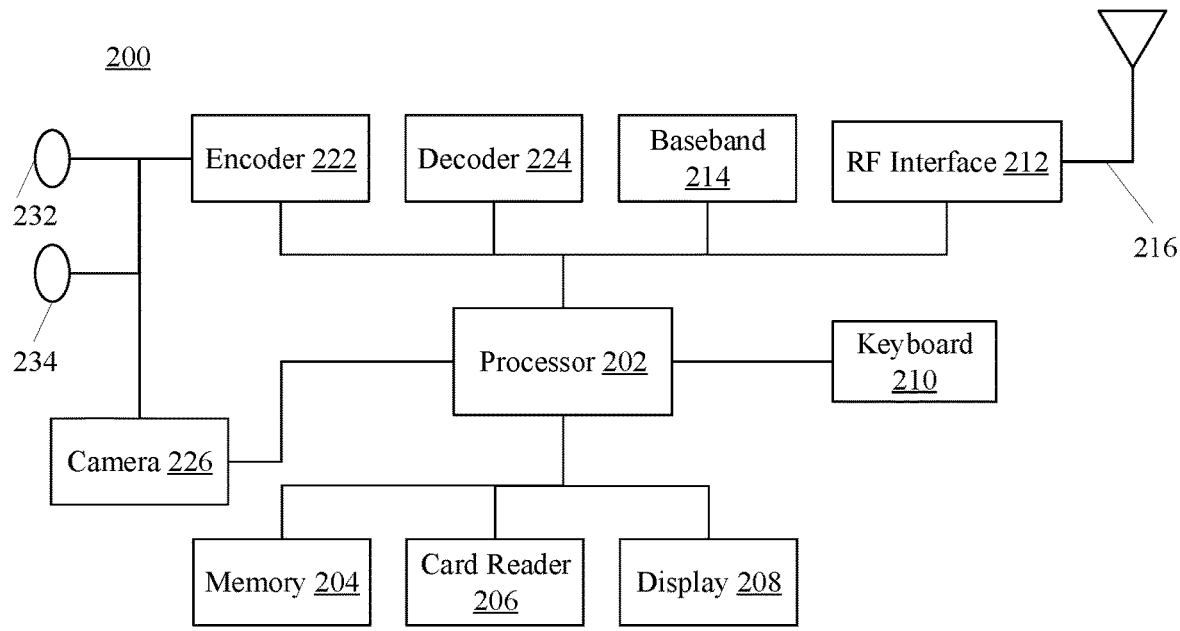
FIG. 2 illustrates an electronic device consistent with embodiments of the present disclosure.

FIG. 2 shows an electronic device for implementing any of the variety of devices 102, 104, and/or 106. As shown in FIG. 2, the electronic device 200 may include a hardware processor 202, a memory 204, a card reader 206, a display 208, a keyboard 210, a radio-frequency (RF) interface 212, a baseband 214, an antenna 216, an encoder 222, a decoder 224, a camera 226, a speaker 232, and a microphone 234, etc. The components shown in FIG. 2 are illustrative, certain components may be omitted, and other components may be added.

The processor 202 may be provided for controlling the electronic device 200. The processor 202 may be connected to other components through one or more bus or other electrical connections to send data to and receive data from the other components. The processor 202 may include one or more processing cores, for example, a 4-core processor or an 8-core processor. The processor 202 may be implemented by using at least one hardware form of digital signal processing (DSP), a field-programmable gate array (FPGA), an application specific integrated circuit (ASIC), and a programmable logic array (PLA). The processor 202 may also include a main processor and a coprocessor. The main processor may be a central processing unit (CPU), and the coprocessor may be a graphics processing unit (GPU) configured to be responsible for rendering and drawing content that a display screen needs to display. In some embodiments, the processor 202 may further include an artificial intelligence (AI) processor. The AI processor is configured to process a computing operation related to machine learning.

The memory 204 may include one or more computer-readable storage media, such as a high-speed random access memory and a nonvolatile memory, for example, one or more disk storage devices or flash storage devices. The memory 204 may store both data in the form of image and audio data and may also store instructions for the processor 202. The card reader 206 may include any type of portable card interface, such as a smart card interface, a communication card interface (e.g., near field communication (NFC) card), or a subscriber identifier module (SIM) card or other card interface for providing user information and being suitable for providing authentication information for authentication and authorization of the user 130.

Further, the display 208 may be any suitable display technology suitable to display an image or video. For example, the display 208 may include a liquid crystal display (LCD) screen, an organic light-emitting diode (OLED) screen, or the like, and may be a touch screen. The keyboard 210 may include a physical or virtual keyboard to input information by the user 130, and may also include other types of input/output devices. The speaker 232 and the microphone 234 may be used to input and output audio for the electronic device 200.

The RF interface 212 (together with the antenna 216) may include RF circuitry for receiving and transmit RF signals. The RF interface 212 may convert an electrical signal to an electromagnetic signal for transmission or convert a received electromagnetic signal into an electrical signal for receiving. The RF interface 212 may communicate with other electronic devices through at least one wireless communication protocol. The wireless communication protocol may include a metropolitan area network, mobile communications networks (2G, 3G, 4G, and 5G) of various generations, a wireless local area network (LAN), and/or a wireless fidelity (WiFi) network. In some embodiments, the RF interface 212 may also include a circuit related to near field communication (NFC). The baseband 214 may include circuitry for processing the signals to and from the RF interface 212.

Further, the camera 226 may include any type of imaging or video capturing device configured to collect an image or a video. When the electronic device 200 is a portable device carried by the user 130, the camera 226 may include a front-facing camera and a rear-facing camera. The front-facing camera may be disposed on the front panel of the electronic device, and the rear-facing camera is disposed on a rear surface of the electronic device. In some embodiments, there are at least two rear-facing cameras, each being any one of a main camera, a depth-of-field camera, a wide-angle camera, and a telephoto camera, so as to implement a background blurring function by fusing the main camera with the depth-of-field camera, and implement panoramic shooting and virtual reality (VR) shooting functions or other fusing shooting functions by fusing the main camera with the wide-angle camera. In some embodiments, the camera 226 may further include a flash.

The encoder 222 and the decoder 224 may be referred as the codec circuitry of the electronic device suitable for carrying out coding and decoding of audio and/or video data or assisting in coding and decoding carried out by the processor 202.

The electronic device 200 as shown in FIG. 2 may include structures similar to those of a mobile terminal or user equipment of a wireless communication system. However, any electronic device or apparatus which may require encoding and decoding, or encoding or decoding video or images may be included.

Returning to FIG. 1, the electronic device 200 (i.e., any one or more of the variety of devices 102, 104, and/or 106) may capture or collect various data (e.g., audio data, environment/operating data, image data, and/or video data) and send the data to the server 122 through the communication link 140. The electronic device 200 may process or pre-process the data before sending the data to the server 122, or may send the unprocessed data to the server 122.

The communication link 140 may include any appropriate type of communication network and may comprise any combination of wired or wireless networks including, but not limited to a wireless cellular telephone network, a wireless local area network (WLAN), a Bluetooth personal area network, an Ethernet local area network, a token ring local area network, a wide area network, and the Internet. The communication link 140 may also include private or public cloud computing platform for voice/data communication. When the Internet or other type of network is included, connectivity to the Internet may include long range wireless connections, short range wireless connections, and various wired connections including telephone lines, cable lines, power lines, and similar communication pathways.

Figure 3:
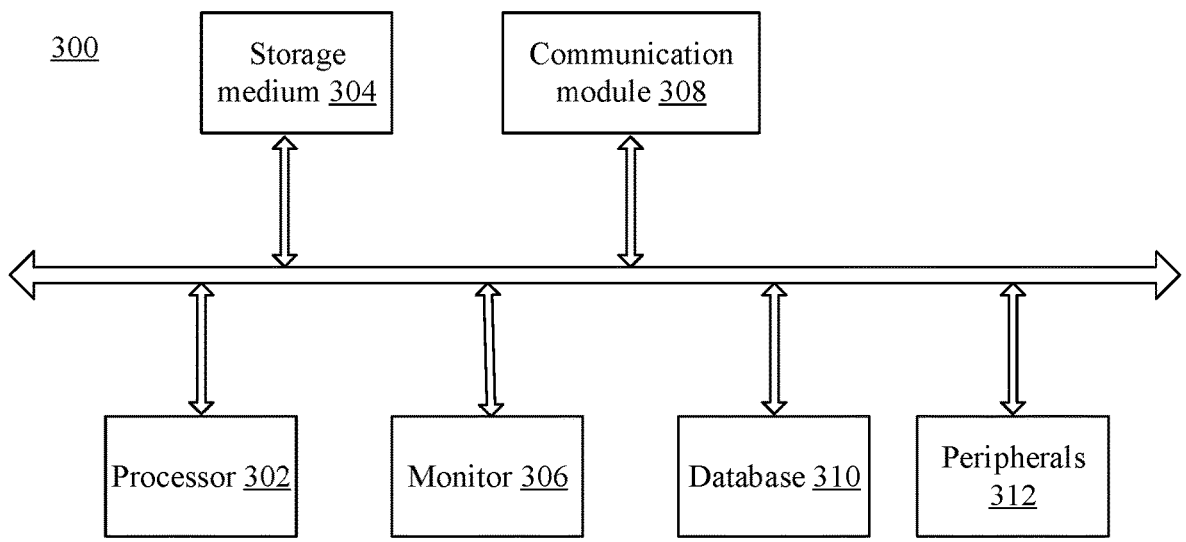
FIG. 3 illustrates a computer system consistent with embodiments of the present disclosure.

The server 122 may include any type of server computer system or multiple computer systems configured in a server cluster or distributed in different locations. The server 122 may also include a cloud server on a cloud computing platform. FIG. 3 illustrates an exemplary computer system implementing certain aspects of server 122.

As shown in FIG. 3, the computer system 300 may include a processor 302, storage medium 304, a monitor 306, a communication module 308, a database 310, and peripherals 312. Certain devices may be omitted and other devices may be included.

Processor 302 may include any appropriate processor or processors. Further, processor 302 can include multiple cores for multi-thread or parallel processing. Storage medium 304 may include memory modules, such as Read-only Memory (ROM), Random Access Memory (RAM), flash memory modules, erasable and rewritable memory, and mass storages, such as CD-ROM, U-disk, and hard disk, etc. Storage medium 304 may store computer programs for implementing various processes, when executed by processor 302.

Further, the peripherals 312 may include I/O devices such as a keyboard and a mouse. The communication module 308 may include network devices for establishing connections through the communication network. The database 310 may include one or more databases for storing certain data and for performing certain operations on the stored data, such as database searching.

Figure 4:
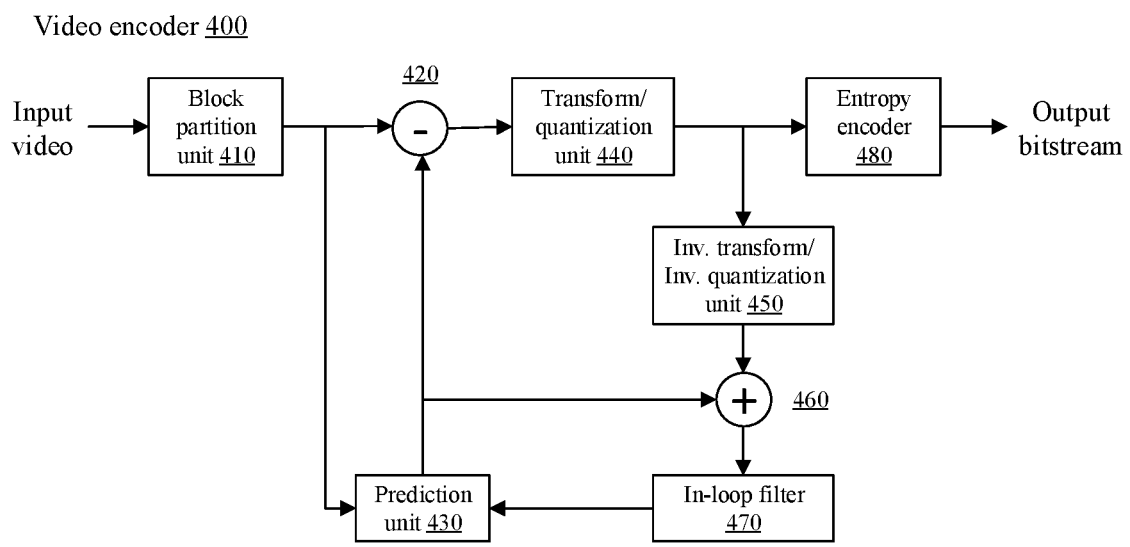
FIG. 4 illustrates a video encoder consistent with embodiments of the present disclosure.

Returning to FIG. 2, the encoder 222 may be an encoder implementing a method of intra mode coding. In this case, the electronic device 200 may also be considered to implement the method of intra mode coding. That is, the encoder 222 may be implemented as a hardware circuitry in the electronic device 200, or may be implemented as a software program by the electronic device 200, or a combination of the hardware circuitry and the software program. FIG. 4 illustrates an exemplary video encoder consistent with the disclosed embodiments of the present disclosure.

As shown in FIG. 4, the video encoder 400 includes a block partition unit 410, a subtraction unit 420, a prediction unit 430, a transform/quantization unit 440, an inverse quantization/inverse transform unit 450, an addition unit 460, an in-loop filter 470, and an entropy encoder 480. An input video is inputted into the encoder 400 and in response, the encoder 400 outputs a bitstream.

The input video includes a plurality of picture frames. Each picture frame is divided into a sequence of coding tree units (CTUs) by the block partition unit 410. For a picture frame that has three sample arrays, a CTU consists of an NxN block of luma samples together with two corresponding NxN blocks of chroma samples. The block partition unit 410 further splits the CTU into coding units (CUs) by using a quaternary-tree structure denoted as coding tree to adapt to various local characteristics. The decision whether to code a picture area using inter-picture (temporal) or intra-picture (spatial) prediction is made at a leaf CU level. Each leaf CU can further split into one, two, or four prediction units (PUs) according to a PU splitting type. Within one PU, the same prediction process is applied and the relevant information is transmitted to a video decoder on a PU basis. After obtaining a residual block by applying the prediction process based on the PU splitting type, a leaf CU can be partitioned into transform units (TUs) according to another quaternary-tree structure similar to the coding tree for the CU.

The prediction unit 430 supports intra prediction, inter prediction, and combined inter and intra prediction. The intra prediction is also called intra mode coding. To capture the arbitrary edge directions presented in a natural video, the prediction unit 430 supports 65 directional (or angular) intra-prediction modes in addition to planar (surface fitting) intra-prediction mode and DC (flat) intra-prediction mode. The prediction unit 430 further supports inter-predicted sample generation based on motion parameters including motion vectors, reference picture indices and reference picture list usage index, and additional information needed for video coding features. The prediction unit 430 also supports a transform skip mode where the CU coded in the transform skip mode or with transform skip is associated with one PU and has no significant residual coefficients, no coded motion vector delta or reference picture index. The prediction unit 430 also supports a merge mode where the motion parameters for the current CU are obtained from neighboring CUs, including spatial and temporal candidates, and additional schedules. The merge mode can be applied to any inter-predicted CU, not only for the transform skip mode. The prediction unit 430 also supports an alternative to the merge mode by explicitly transmitting motion parameters, where the motion vector, the corresponding reference picture index for each reference picture list and reference picture list usage flag, and other needed information are signaled explicitly per each CU.

The subtraction unit 420 outputs a difference (or a residual) between the CU and the PU to the transform/quantization unit 440.

The transform/quantization unit 440 supports large block-size transforms up to 64×64 in size. High frequency transform coefficients are zeroed out for the transform blocks with size equal to 64, so that only the lower-frequency coefficients are retained. When transforming a large block in the transform skip mode, the transform/quantization unit 440 uses the entire block without zeroing out any values. The transform/quantization unit 440 also supports multiple transform selection (MTS) for core transform. To control the MTS, the transform/quantization unit 440 uses separate enabling flags at a sequence parameter set (SPS) level for intra and inter prediction, respectively. When the MTS is enabled at the SPS level, a CU level flag is signaled to indicate whether the MTS is applied or not. The transform/quantization unit 440 also supports other transform features described in the VVC and AV1 draft standards, such as low-frequency non-separable transform (LFNST) and sub-block transform (SBT).

Further, the transform/quantization unit 440 supports a maximum of 63 quantization parameters (QPs). The transform/quantization unit 440 also supports a flexible luma-to-chroma QP mapping by signaling the luma-to-chroma mapping relationship in the SPS. The transform/quantization unit 440 also supports CU-level QP adaption where delta QP values for luma and chroma components can be signaled separately. The transform/quantization unit 440 also supports other quantization features described in the VVC and AV1 standards, such as dependent quantization.

The transform/quantization unit 440 also supports joint coding of chroma residuals, which is indicated by a TU-level flag.

Context-based Adaptive Binary Arithmetic Coding (CABAC) may be described as the entropy coding algorithm. The entropy encoder 480 includes a CABAC coding engine to encode syntax elements outputted by the transform/quantization unit 440. The CABAC coding engine supports arithmetic coding algorithms such as Golomb-Rice coding algorithm. The entropy encoder 480 supports separate residual coding structures for a transform block and a transform skip block. The entropy encoder 480 codes the transform coefficients of a coding block by using non-overlapped coefficient groups (CGs or sub-blocks) and each CG contains the transform coefficients of a coding block of a variable size. The size of the coefficient group is selected based on a transform block size only, which is independent of channel type. The size of the CGs may include 1×16, 2×8, 8×2, 2×4, 4×2, and 16×1. The CGs inside each coding block and the transform coefficients within each CG are coded according to pre-defined scanning orders.

Each coding block in a transform unit is split into a plurality of sub-blocks and each sub-block is split into a plurality of pixels. The plurality of sub-blocks include 4×4 or 2×2 sub-blocks.

In the arithmetic coding algorithm, a probability model is dynamically selected for each syntax element depending on an absolute level of the syntax element or a partially reconstructed absolute level of the syntax element in a local neighborhood.

The inverse quantization/inverse transform unit 450 reverses the quantization process and the transform process performed by the transform/quantization unit 440 and feeds an output to the addition unit 460 to reconstruct the picture frame. The addition unit 460 also takes the output of the prediction unit 430 as another input. The reconstructed picture will be filtered by the in-loop filter 470. The in-loop filter 470 includes a deblocking filter, a sample adaptive offset (SAO) filter, and an adaptive loop filter (ALF), which are cascaded in this order. The output of the in-loop filter 470 is inputted into the prediction unit 430.

Figure 5:
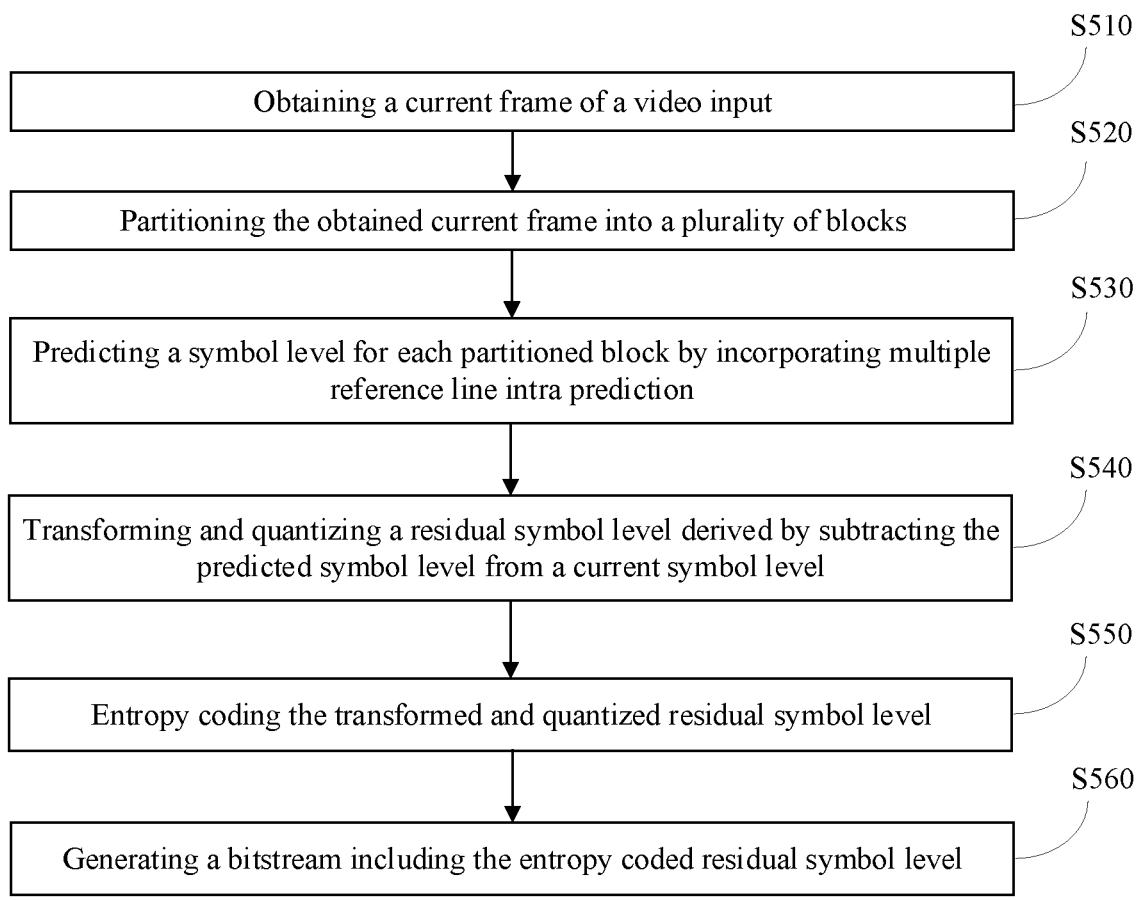
FIG. 5 illustrates an exemplary video coding method consistent with embodiments of the present disclosure.

The present disclosure provides a video coding method. FIG. 5 illustrates a flowchart of an exemplary video coding method consistent with embodiments of the present disclosure. As shown in FIG. 5, the video coding method includes obtaining a current frame of a video input (at S510). After the current frame is obtained, the current video frame may be divided into a plurality of blocks according to a partition tree structure.

At S520, the obtained current frame is partitioned into a plurality of blocks. The current video frame may be divided into various square and rectangular partitions. The square partitions may be further divided into smaller partitions. But the rectangular partitions cannot be further divided.

At S530, after the current frame is partitioned to the plurality of blocks, a symbol level is predicted for each partitioned block by incorporating multiple reference line intra prediction. For each block, intra prediction modes are derived based on multiple reference lines of neighboring blocks. A subset of all available intra prediction modes defined in the video coding scheme based on the AV1 standard is determined for each of the multiple reference lines. The subset of all available intra prediction modes is also called an allowed intra prediction mode (AIPM) set.

Each of the multiple reference lines is identified by an index number. The index number is an integer greater than or equal to zero.

In the video coding scheme based on the AV1 standard, the number of available intra prediction modes is 62, which includes 56 angular intra prediction modes, 5 smooth modes, and one chroma from luma mode. When multiple reference lines are applied in intra prediction and all the intra prediction modes are included for the multiple reference lines, the video coding complexity is substantial. The multiple reference lines include a zero reference line with an index number equal to zero and one or more non-zero reference lines with the index numbers greater than zero. The number of the intra prediction modes allowed for each of the reference lines needs to be limited to reduce the video coding complexity.

Certain restrictions may apply to the multiple reference line intra prediction. The multiple reference line intra prediction may be disabled for narrow blocks. The narrow blocks has a width W, a height H, and abs($\log_2$ W− $\log_2$H) >1. The multiple reference line intra prediction may be disabled for small blocks. The size of the small blocks is 8x8 or less. The multiple reference line intra prediction may be disabled for the first line of blocks inside a coding tree unit (CTU) to prevent using extended reference samples outside the current CTU line. Other restriction may also apply.

The present disclosure provides a method of video coding with multiple reference line intra prediction to improve coding efficiency and compression performance. The corresponding intra prediction modes determined for each of the multiple reference lines based on the coding efficiency and compression performance are a subset of all the available intra prediction modes defined in the video coding scheme based on the AV1 standard. The subset is also called the AIPM set. The intra prediction modes included in the AIPM set are signaled by the video coding device, such as the video encoder 400 shown in FIG. 4. Because the number of the intra prediction modes included in the AIPM set is less than the number of all the available intra prediction modes defined in the corresponding video coding scheme, fewer bits are needed to signal the intra prediction modes included in the AIPM set. Further, the symbol level may be predicted for each block in inter prediction modes in addition to the intra prediction modes.

After the symbol level is predicted, a residual symbol level is transformed and quantized. The residual symbol level is a difference between the current symbol level and the predicted symbol level.

Figure 6:
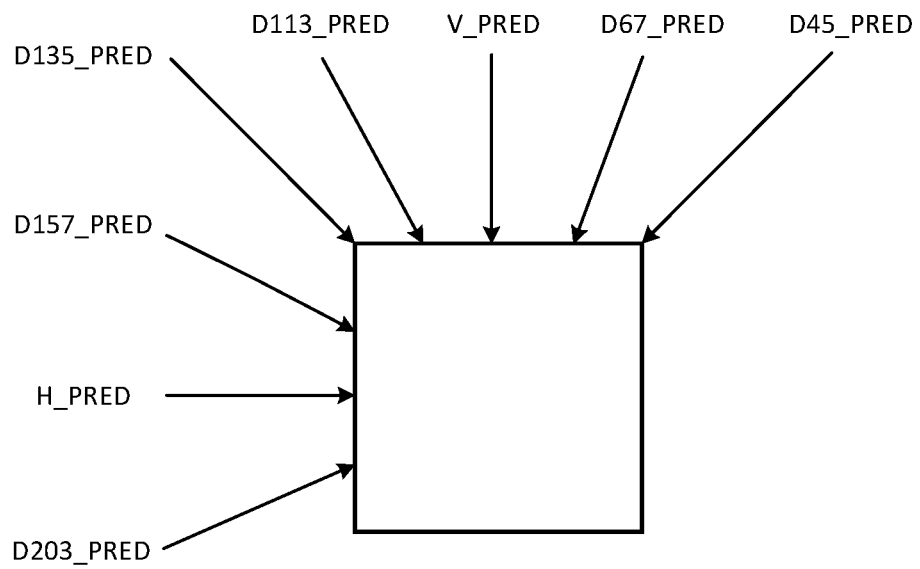
FIG. 6 illustrates 8 nominal angles of the intra prediction modes in the video coding scheme based on the AV1 standard.

The intra prediction modes in the video coding scheme based on the AV1 standard include 56 angular (or directional) intra prediction modes, 5 non-angular smooth intra prediction modes, one chroma only intra prediction mode, and some other intra prediction modes. 8 directional (or angular) modes correspond to angles from 45 to 207 degrees. To exploit more varieties of spatial redundancy in directional textures, directional intra prediction modes are extended to an angle set with finer granularity. The angles of the 8 directional modes are slightly changed and made as nominal angles, and these 8 nominal angles are also called nominal intra angles and named as V_PRED, H_PRED, D45_PRED, D135_PRED, D113_PRED, D157_PRED, D203_PRED, and D67_PRED, corresponding to 90°, 180°, 45°, 135°, 113°, 157°, 203°, and 67°, as illustrated in FIG. 6. Each nominal angle is extended to 7 finer angles. 56 directional angles (also known as intra angles or prediction angles) are defined in total. Each prediction angle is presented by a nominal intra angle plus an angle delta, which is −3—3 multiplies the step size of 3 degrees. To implement directional intra prediction modes via a generic way, all the 56 directional intra prediction modes are implemented with a unified directional predictor that projects each pixel to a reference sub-pixel location and interpolates the reference pixel by a 2-tap bilinear filter.

Figure 7:
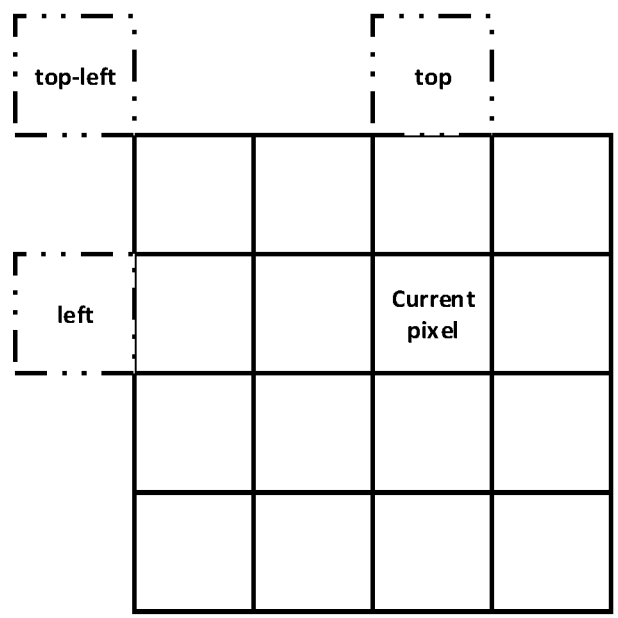
FIG. 7 illustrates top, left, and top-left positions for PAETH mode consistent with embodiments of the present disclosure.

The intra prediction modes also include 5 non-directional smooth intra prediction modes, which are a DC mode, a PAETH mode, a SMOOTH mode, a SMOOTH_V mode, and a SMOOTH_H mode. For the DC mode, the average of left and above neighboring samples is used as the predictor of the block to be predicted. For the PAETH mode, top, left and top-left reference samples are firstly fetched, and then the value which is closest to (top+left−top-left) is set as the predictor for the pixel to be predicted. FIG. 7 illustrates the positions of top, left, and top-left samples for one pixel in the current block. For the SMOOTH mode, the SMOOTH_V mode, and the SMOOTH_H mode, they predict the block using quadratic interpolation in vertical or horizontal directions, or the average in both directions.

Figure 8:
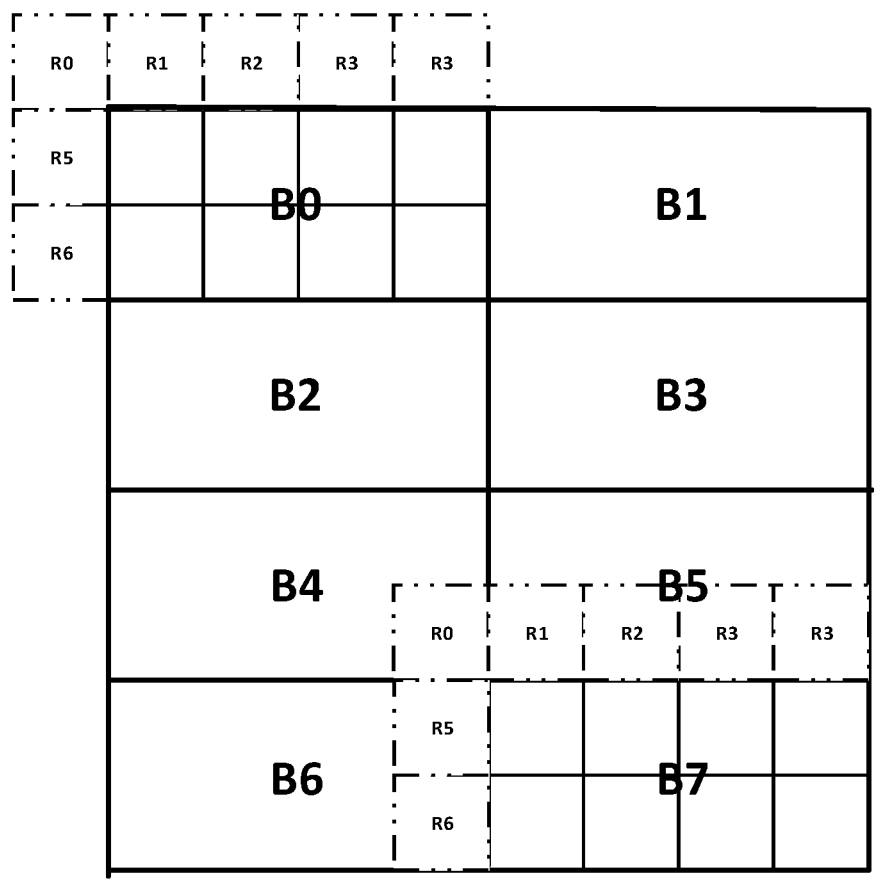
FIG. 8 illustrates examples of recursive intra filtering modes consistent with embodiments of the present disclosure.

To capture decaying spatial correlation with references on the edges, FILTER INTRA modes are designed for luma blocks. Five filter intra modes are defined. Each of the five filter intra modes is represented by a set of eight 7-tap filters reflecting correlation between pixels in a 4×2 patch and 7 adjacent neighbors. In other words, the weighting factors for 7-tap filter are position dependent. Take an 8×8 block for example, it is split into 8 4×2 patches, as shown in FIG. 8. These patches are indicated by B0, B1, B2, B3, B4, B5, B6, and B7 in FIG. 8. For each patch, 7 adjacent neighbors, indicated by R0~R7, are used to predict the pixels in the current patch. For the patch B0, all the adjacent neighbors are already reconstructed. But for other patches, not all the adjacent neighbors are reconstructed. The predicted values of the adjacent neighbors are used as references. For example, all the adjacent neighbors of the patch B7 are not reconstructed, so the prediction samples of the adjacent neighbors (i.e., B5 and B6) are used instead.

Chroma from Luma (CfL) is a chroma-only intra predictor that models chroma pixels as a linear function of coincident reconstructed luma pixels. The CfL prediction is expressed as follows:

$$CfL(a) = a \times L_{AC} + DC$$

where $L_{AC}$ denotes the AC contribution of the luma component, a denotes the parameter of the linear model, and DC denotes the DC contribution of the chroma component. Specifically, the reconstructed luma pixels are subsampled into the chroma resolution, and then the average value is subtracted to form the AC contribution. To approximate chroma AC component from the AC contribution, instead of requiring the decoder to calculate the scaling parameters, CfL determines the parameter a based on the original chroma pixels and signals them in the bitstream. This approach reduces decoder complexity and yields more precise predictions. As for the DC contribution of the chroma component, it is computed using intra DC mode, which is sufficient for most chroma contents and has mature fast implementations.

Figure 9:
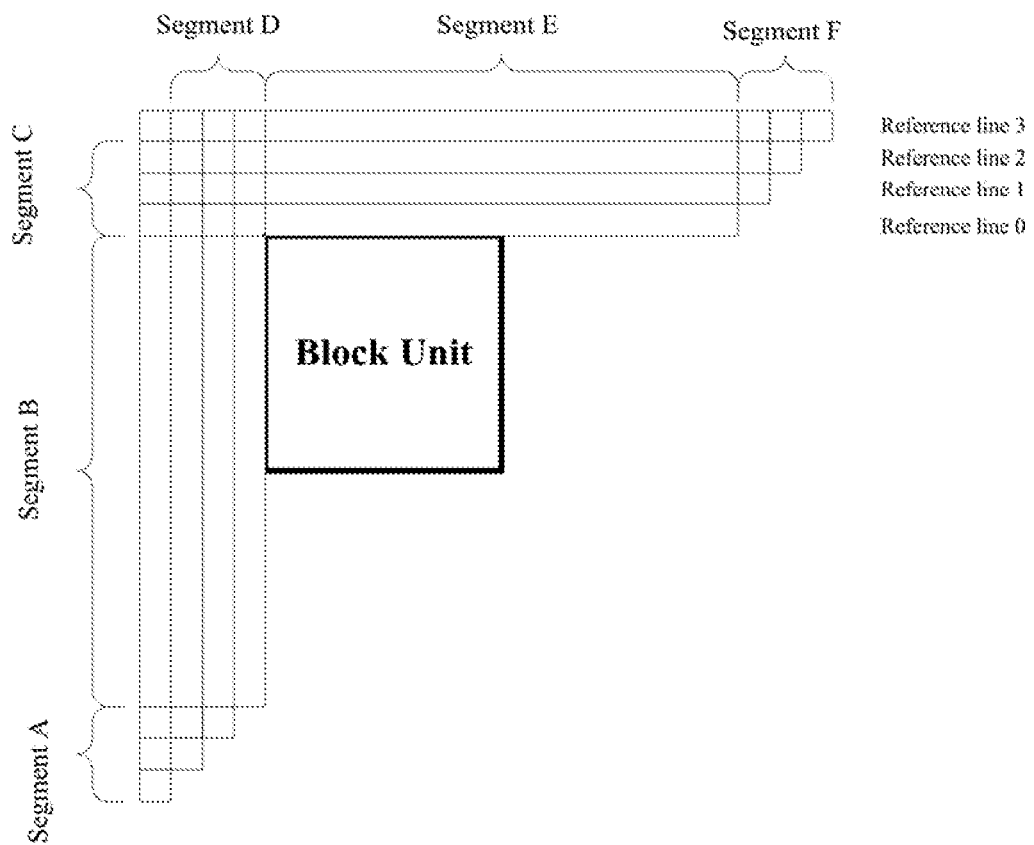
FIG. 9 illustrates an example of 4 reference lines consistent with embodiments of the present disclosure.

The multiple reference line intra prediction uses multiple reference lines for the intra prediction, and the video encoder 400 as shown in FIG. 4 decides and signals which reference line is used to generate the intra predictor. The index number of the reference line is signaled preceding the intra prediction modes, and only the most probable modes (MPM) or equivalent are allowed in case the index number of a non-zero reference line is signaled. As shown in FIG. 9, an example of 4 reference lines is depicted, where each reference line is composed of six segments, i.e., Segments A to F, together with the top-left reference sample. In addition, Segments A and F are padded with the closest samples from Segments B and E, respectively.

As shown in FIG. 9, the index number of the reference line sequentially increases as the reference line is further away from the current block. The reference line immediately adjacent to the current block is called a zero reference line and has the index number equal to zero, which is Reference line 0 in FIG. 9. The AIPM set corresponding to the zero reference line is denoted as S2. The reference line with the index number greater than zero is called a non-zero reference line. The AIPM set corresponding to any non-zero reference line is denoted as S1. S2 includes at least all the intra prediction modes in S1. S1 is a subset of S2.

Returning to FIG. 5, at S540, a residual symbol level derived by subtracting the predicted symbol level from a current symbol level is transformed and quantized. Large block-size transforms include up to 64×64 in size. High frequency transform coefficients are zeroed out for the transform blocks with size equal to 64, so that only the lower-frequency coefficients are retained. When transforming a large block in the transform skip mode, the entire block is used without zeroing out any values. Further, multiple transform selection (MTS) is supported for core transform. To control the MTS, separate enabling flags are used at a sequence parameter set (SPS) level for intra and inter prediction, respectively. When the MTS is enabled at the SPS level, a CU level flag is signaled to indicate whether the MTS is applied or not. Other transform features may be supported, such as low-frequency non-separable transform (LFNST) and sub-block transform (SBT).

Further, a maximum of 63 quantization parameters (QPs) is supported by the transforming and quantizing process. A flexible luma-to-chroma QP mapping is also supported by signaling the luma-to-chroma mapping relationship in the SPS. The CU-level QP adaption where delta QP values for luma and chroma components can be signaled separately may also be supported. Other quantization features, such as dependent quantization may also be supported.

Returning to FIG. 5, at S550, the transformed and quantized residual symbol level is entropy coded. The entropy coding algorithm may be Context-based Adaptive Binary Arithmetic Coding (CABAC). A CABAC coding engine may be used to encode syntax elements outputted by the transforming and quantizing process. The CABAC coding engine supports arithmetic coding algorithms such as Golomb-Rice coding algorithm. Separate residual coding structures may be supported for a transform block and a transform skip block. The transform coefficients of a coding block may be coded by using non-overlapped coefficient groups (CGs or sub-blocks) and each CG contains the transform coefficients of a coding block of a variable size.

The size of the coefficient group is selected based on a transform block size only, which is independent of channel type. The size of the CGs may include 1×16, 2×8, 8×2, 2×4, 4×2, and 16×1. The CGs inside each coding block and the transform coefficients within each CG are coded according to pre-defined scanning orders.

As shown in FIG. 5, at S560, a bitstream including the entropy coded residual symbol level is generated. As a result of entropy coding, the bitstream including the entropy coded residual symbol level is generated. The bitstream may be transmitted and/or stored. A decoder may perform a video decoding method corresponding to the video encoding method consistent with the present disclosure to restore the original video.

Accordingly, the present disclosure provides a video coding method. The method includes multiple reference lines in intra prediction and determines the AIPM set for each reference line such that the total number of the intra predictions modes for the multiple reference lines is limited. By reducing the total number of the intra prediction modes for the multiple reference lines, fewer bits are needed to code the signaling flags and the index numbers of the intra prediction modes, thereby improving the coding efficiency and the compression performance of the video coding scheme.

The embodiments of the encoders and decoders consistent with the present disclosure may be implemented by processing circuitry (e.g., one or more processors or one or more integrated circuits), which executes program instructions stored in a non-transitory computer-readable storage medium.

Figure 10:
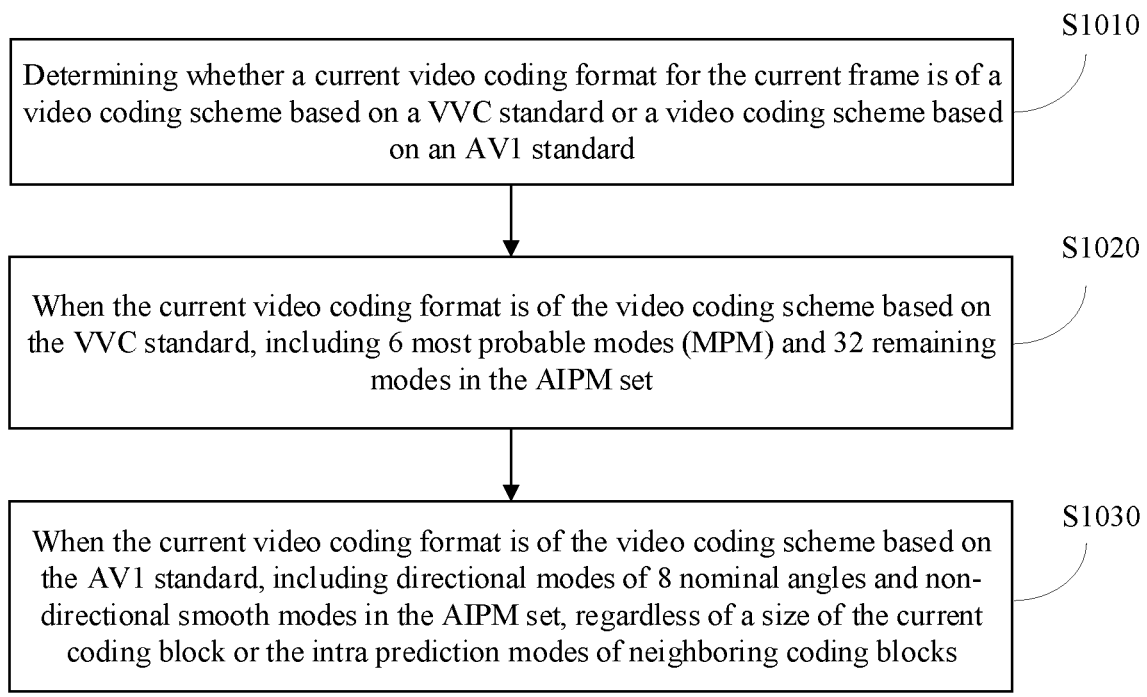
FIG. 10 illustrates a flowchart of determining the intra prediction modes included in S1 consistent with embodiments of the present disclosure.

FIG. 10 illustrates a flowchart of determining the intra prediction modes included in S1 consistent with embodiments of the present disclosure. In one embodiment, as shown in FIG. 10, at S1010, angular intra prediction modes with nominal angles are included in S1 regardless of a size of the current block and the intra prediction modes of neighboring blocks. S1 includes angular intra prediction modes of eight nominal angles regardless of the size of the current block or the intra prediction modes of neighboring blocks, where the eight nominal angles are 45°, 67°, 90°, 113°, 135°, 157°, 180°, and 203°.

At S1020, either a SMOOTH_V mode or a SMOOTH_H mode is included in S1 regardless of the size of the current block and the intra prediction modes of the neighboring blocks. The SMOOTH_V mode and the SMOOTH_H mode are the intra prediction modes using quadratic interpolation in a vertical direction or a horizontal direction, respectively When the height of the current block is greater than or equal to the width of the current block, the SMOOTH_V mode is included in S1. When the width of the current block is greater than the height of the current block, the SMOOTH_H mode is included in S1.

Alternatively, when the width of the current block is greater than or equal to the height of the current block, the SMOOTH_V mode is included in S1. When the height of the current block is greater than the width of the current block, the SMOOTH_H mode is included in S1.

At S1030, any non-angular intra prediction mode other than the SMOOTH_V mode or the SMOOTH_H mode is excluded in S1. By excluding less probable intra prediction modes, the number of the intra prediction modes included in S1 is limited to improve the coding efficiency and the compression performance.

In one embodiment, the intra prediction modes included in S1 and S2 may be determined by splitting S2 into a first level and a second level, including $2^L$ number of the intra prediction modes at the first level of S2 and $2^M$ number of the intra prediction modes at the second level of S2, where L and M are integers greater than 1, and including the angular intra prediction modes at the first level of S2 in S1. Thus, the intra prediction modes included in S1 and S2 can be coded efficiently.

Similarly, in another embodiment, the intra prediction modes included in S1 and S2 may be determined by splitting S2 into a first level, a second level, and a third level, including $2^L$ number of the intra prediction modes at the first level of S2, $2^M$ number of the intra prediction modes at the second level of S2, and $2^N$ number of the prediction modes at the third level of S2, where L, M, and N are integers greater than 1, and including the angular intra prediction modes at the first and the second levels of S2 in S1. Thus, the intra prediction modes included in S1 and S2 can be coded efficiently.

In some embodiments, the video coding method consistent with the present disclosure may further include at least one angular intra prediction mode of a non-nominal angle in S1 when one of the intra prediction modes of the neighboring blocks is an angular intra prediction mode.

Because the zero reference line is closer to the current block than the non-zero reference lines, S2 has more substantial influence than S1 in the multiple reference line intra prediction. As such, S1 is a subset of S2. However, most probable intra prediction modes included in S2 are also included in S1. In one example, all the angular intra prediction modes of S2 may be included in S1 as well. On the other hand, the present disclosure does not prevent that S1 and S2 are exactly the same.

In another example, the angular intra prediction modes are considered as more probable intra prediction modes than the non-angular intra prediction modes. All the angular intra prediction modes of S2 are also included in S1 but all the non-angular intra prediction modes of S2 are excluded in S1. Alternatively, more angular intra prediction modes may be included in S1 than S2.

Further, the number of the intra prediction modes included in S1 may depend on the intra prediction modes of the neighboring blocks of the corresponding reference line. The intra prediction modes included in S1 and S2 are derived from N neighboring blocks. When M neighboring blocks out of N neighboring blocks include certain intra prediction modes, the number of the intra prediction modes included in S1 may be reduced. In this case, M and N are positive integers and M is less than or equal to N. The certain intra prediction modes include the non-angular intra prediction modes, such as the DC mode, the recursive modes, the PAETH mode, the SMOOTH mode, the SMOOTH_H mode, and the SMOOTH_V mode, which have already been described in some previous embodiments. In one example, M=2 and N=2. The number of the intra prediction modes included in S1 is reduced to zero. In this case, the neighboring blocks of the corresponding reference line are excluded from deriving the intra prediction modes for the current block, and the index number of the corresponding reference line is not signaled in the video coding process.

In another example, the number of the intra prediction modes included in S1 may depend on both the intra prediction modes of the neighboring blocks and the index number of the corresponding reference line. The index numbers of the reference lines reflect the proximity of the neighboring blocks to the current block. Including the index number of the corresponding reference line when determining the intra prediction modes included in S1 takes into account the proximity information. For example, the smaller the index number, the larger the number of the intra prediction modes included in S1.

In another example, for chroma component, only when each and every neighboring block of a non-zero reference line includes at least one angular intra prediction mode, the corresponding non-zero reference line may be included in the multiple reference line intra prediction process for deriving the intra prediction modes.

In another example, for chroma component, only when each and every neighboring block of a non-zero reference line includes a same angular intra prediction mode, the corresponding non-zero reference line may be included in the multiple reference line intra prediction process for deriving the intra prediction modes.

In the embodiments of the present disclosure, the video coding method supports the multiple reference line intra prediction in the video coding schemes based on the AV1 standard. The number of the intra prediction modes included in each reference line is limited to improve the coding efficiency and the compression performance.

Figure 11:
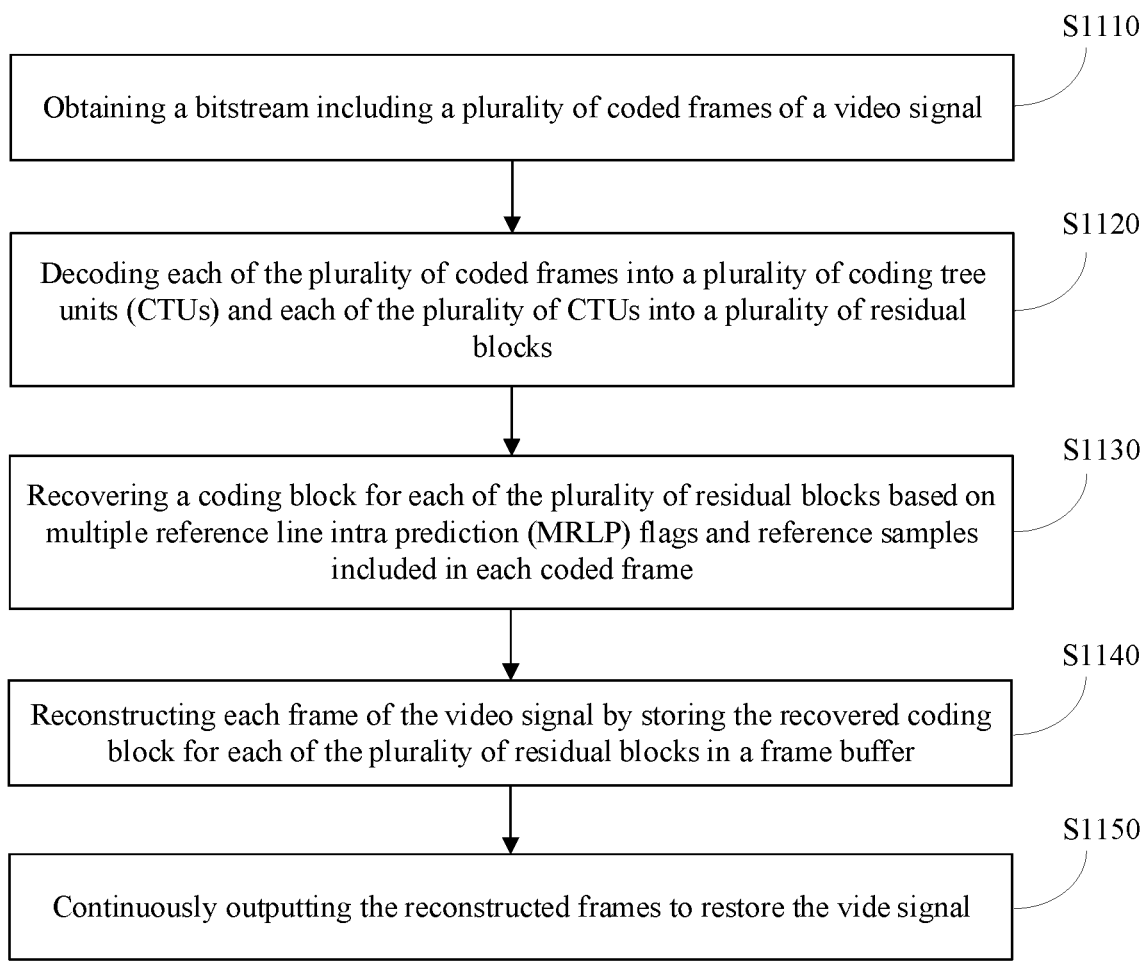
FIG. 11 illustrates an exemplary video decoding method consistent with embodiments of the present disclosure.

The present disclosure also provides a video decoding method. FIG. 11 illustrates an exemplary video decoding method consistent with embodiments of the present disclosure. As shown in FIG. 11, a bitstream including a plurality of coded frames of a video input is obtained (at S1110). The bitstream may be generated by a video encoding system performing the video encoding method as shown in FIG. 5.

At S1120, each of the plurality of coded frames is decoded into a plurality of CTUs and each of the plurality of CTUs is decoded into a plurality of residual blocks. The bitstream includes header information to indicate the boundaries of the plurality of CTUs and the boundaries of the plurality of residual blocks contained in each of the plurality of CTUs. Each of the plurality of residual blocks may be entropy coded. An entropy decoding process followed by an inverse transform and inverse quantization process may be performed to obtain each of the plurality of residual blocks. The entropy decoding process and the inverse transform and inverse quantization process reverses the entropy coding process and the transform and the quantization process performed at S540 and S550 of the video encoding method shown in FIG. 5.

At S1130, a coding block for each of the plurality of residual blocks is recovered based on MRLP flags and reference samples included in each coded frame. Specifically, the coding block is decoded from the corresponding residual block by reversing the MRLP process based on the MRLP flags and the reference samples included in each coded frame, which are determined at S530 of the video encoding method shown in FIG. 5.

Then, the recovered coding block for each of the plurality of residual blocks in each of the plurality of CTUs is stored in a frame buffer to reconstruct each frame of the video signal (at S1140). This process assembles a plurality of coding blocks into a CTU and a plurality of CTUs into a frame of the video signal by reversing S520 of the video encoding method shown in FIG. 5.

Finally, the assembled frames are outputted continuously to restore the video signal (at S1150). This process reverses S510 of the video encoding method shown in FIG. 5.

In the embodiments of the present disclosure, the video coding method supports the multiple reference line intra prediction in the video coding schemes based on the AV1 standard. The number of the intra prediction modes included in each reference line is limited to improve the coding efficiency and the compression performance.

Although the principles and implementations of the present disclosure are described by using specific embodiments in the specification, the foregoing descriptions of the embodiments are only intended to help understand the method and core idea of the method of the present disclosure. Meanwhile, a person of ordinary skill in the art may make modifications to the specific implementations and application range according to the idea of the present disclosure. In conclusion, the content of the specification should not be construed as a limitation to the present disclosure.

What is claimed is:

1. A video decoding method, comprising:
   obtaining a bitstream including a plurality of coded frames of a video signal;
   decoding each of the plurality of coded frames into a plurality of coding tree units (CTUs) and each of the plurality of CTUs into a plurality of residual blocks;
   recovering a coding block for each of the plurality of residual blocks based on multiple reference line intra prediction (MRLP) flags and reference samples included in each coded frame, wherein:
   each of the multiple reference lines is identified by an index number, which is an integer greater than or equal to zero;
   the index number of the reference line sequentially increases as the reference line is further away from a current block;
   the reference line immediately adjacent to the current block is called a zero reference line and has the index number equal to zero, and S2 is determined from an allowed intra prediction mode (AIPM) set corresponding to the zero reference line;
   the reference line with the index number greater than zero is called a non-zero reference line and S1 is determined from an AIPM set corresponding to the non-zero reference line; and
   the sizes of S1 and S2 are limited to a power of 2 or a sum of multiples of power of 2 to reduce a number of bits needed to encode the MRLP flags, each of the power of 2 is a number greater than 2, and S1 is obtained by excluding some non-angular intra prediction modes from S2;
   reconstructing each frame of the video signal by storing the recovered coding block for each of the plurality of residual blocks in a frame buffer; and
   continuously outputting the reconstructed frames to restore the video signal.

2. The method according to claim 1, wherein the intra prediction modes included in S1 are determined by:
   including angular intra prediction modes with nominal angles regardless of a size of the current block and the intra prediction modes of neighboring blocks;
   including either a SMOOTH_V mode or a SMOOTH_H mode regardless of the size of the current block and the intra prediction modes of the neighboring blocks; and
   excluding any non-angular intra prediction mode other than the SMOOTH_V mode or the SMOOTH H mode, wherein:
   the nominal angles are 45°, 67°, 90°, 113°, 135°, 157°, 180°, and 203°; and
   the SMOOTH_V mode and the SMOOTH_H mode are the intra prediction modes using quadratic interpolation in a vertical direction or a horizontal direction, respectively.

3. The method according to claim 2, wherein:
   when the height of the current block is greater than or equal to the width of the current block, the SMOOTH V mode is included in S1; and
   when the width of the current block is greater than the height of the current block, the SMOOTH H mode is included in S1.

4. The method according to claim 2, wherein:
   when the width of the current block is greater than or equal to the height of the current block, the SMOOTH V mode is included in S1; and
   when the height of the current block is greater than the width of the current block, the SMOOTH H mode is included in S1.

5. The method according to claim 1, wherein the intra prediction modes included in S1 and S2 are determined by:
   splitting S2 into a first level and a second level;
   including $2^L$ number of the intra prediction modes at the first level of S2 and $2^M$ number of the intra prediction modes at the second level of S2, wherein L and M are integers greater than 1; and
   including the angular intra prediction modes at the first level of S2 in S1.

6. The method according to claim 1, wherein the intra prediction modes included in S1 and S2 are determined by:
   splitting S2 into a first level, a second level, and a third level;
   including $2^L$ number of the intra prediction modes at the first level of S2, $2^M$ number of the intra prediction modes at the second level of S2, and $2^N$ number of the prediction modes at the third level of S2, wherein L, M, and N are integers greater than 1; and
   including the angular intra prediction modes at the first and the second levels of S2 in S1.

7. The method according to claim 1, wherein the intra prediction modes included in S1 are determined by:
   when one of the intra prediction modes of the neighboring blocks is an angular intra prediction mode, including at least one angular intra prediction mode of non-nominal angles.

8. The method according to claim 1, wherein the intra prediction modes included in S1 and S2 are determined by:
   including all the angular intra prediction modes of S2 in S1.

9. The method according to claim 1, wherein the intra prediction modes included in S1 and S2 are determined by:
   including all the angular intra prediction modes of S2 in S1; and
   excluding all the non-angular intra prediction modes of S2 in S1.

10. The method according to claim 1, wherein the intra prediction modes included in S1 and S2 are determined by:
    including more angular intra prediction modes in S1 than S2.

11. A video encoding method, comprising:
    obtaining a current frame of a video input;
    partitioning the obtained current frame into a plurality of blocks;
    predicting a symbol level for each partitioned block by incorporating multiple reference line intra prediction (MRLP) flags and reference samples included in each coded frame, wherein:
    intra prediction modes are derived based on multiple reference lines of neighboring blocks;
    each of the multiple reference lines is identified by an index number, which is an integer greater than or equal to zero;
    the index number of the reference line sequentially increases as the reference line is further away from a current block;
    the reference line immediately adjacent to the current block is called a zero reference line and has the index number equal to zero, and S2 is determined from an allowed intra prediction mode (AIPM) set corresponding to the zero reference line;
    the reference line with the index number greater than zero is called a non-zero reference line and S1 is determined from an AIPM set corresponding to the non-zero reference line; and the sizes of S1 and S2 are limited to a power of 2 or a sum of multiples of power of 2 to reduce a number of bits needed to encode the MRLP flags, each of the power of 2 is a number greater than 2, and S1 is obtained by excluding some non-angular intra prediction modes from S2;

transforming and quantizing a residual symbol level derived by subtracting the predicted symbol level from a current symbol level;

entropy coding the transformed and quantized residual symbol level; and generating a bitstream including the entropy coded residual symbol level.

12. The method according to claim 11, wherein the intra prediction modes included in S1 are determined by:

including angular intra prediction modes with nominal angles regardless of a size of the current block and the intra prediction modes of neighboring blocks; and including either a SMOOTH_V mode or a SMOOTH_H mode regardless of the size of the current block and the intra prediction modes of the neighboring blocks, wherein:

the nominal angles are 45°, 67°, 90°, 113°, 135°, 157°, 180°, and 203°; and the SMOOTH_V mode and the SMOOTH_H mode are the intra prediction modes using quadratic interpolation in a vertical direction or a horizontal direction, respectively.

13. The method according to claim 12, wherein:

when the height of the current block is greater than or equal to the width of the current block, the SMOOTH V mode is included in S1; and when the width of the current block is greater than the height of the current block, the SMOOTH H mode is included in S1.

14. The method according to claim 12, wherein:

when the width of the current block is greater than or equal to the height of the current block, the SMOOTH V mode is included in S1; and when the height of the current block is greater than the width of the current block, the SMOOTH H mode is included in S1.

15. The method according to claim 11, wherein the intra prediction modes included in S1 and S2 are determined by:

splitting S2 into a first level and a second level;

including $2^L$ number of the intra prediction modes at the first level of S2 and $2^M$ number of the intra prediction modes at the second level of S2, wherein L and M are integers greater than 1; and including the angular intra prediction modes at the first level of S2 in S1.

16. The method according to claim 11, wherein the intra prediction modes included in S1 and S2 are determined by:

splitting S2 into a first level, a second level, and a third level;

including $2^L$ number of the intra prediction modes at the first level of S2, $2^M$ number of the intra prediction modes at the second level of S2, and $2^N$ number of the prediction modes at the third level of S2, wherein L, M, and N are integers greater than 1; and including the angular intra prediction modes at the first and the second levels of S2 in S1.

17. The method according to claim 11, wherein the intra prediction modes included in S1 are determined by:

when one of the intra prediction modes of the neighboring blocks is an angular intra prediction mode, including at least one angular intra prediction mode of non-nominal angles.

* * * * *